US009525176B2

(12) United States Patent
Gschneidner, Jr. et al.

(10) Patent No.: US 9,525,176 B2
(45) Date of Patent: Dec. 20, 2016

(54) METHOD FOR PRODUCING LA/CE/MM/Y BASE ALLOYS, RESULTING ALLOYS AND BATTERY ELECTRODES

(71) Applicants: Karl A. Gschneidner, Jr., Ames, IA (US); Frederick A. Schmidt, Ames, IA (US)

(72) Inventors: Karl A. Gschneidner, Jr., Ames, IA (US); Frederick A. Schmidt, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 661 days.

(21) Appl. No.: 13/694,846

(22) Filed: Jan. 10, 2013

(65) Prior Publication Data

US 2013/0129564 A1    May 23, 2013

Related U.S. Application Data

(63) Continuation of application No. PCT/US2011/001277, filed on Jul. 19, 2011.

(Continued)

(51) Int. Cl.
*C22C 1/00* (2006.01)
*H01M 4/66* (2006.01)

(Continued)

(52) U.S. Cl.
CPC ............. *H01M 4/662* (2013.01); *C22C 1/00* (2013.01); *C22C 28/00* (2013.01); *C22C 30/00* (2013.01);

(Continued)

(58) Field of Classification Search
CPC .................... C22C 1/00; C22C 30/00
(Continued)

(56) References Cited

U.S. PATENT DOCUMENTS 4,018,597 A * 4/1977 Staggers ............... 75/303
4,108,645 A * 8/1978 Mitchell ............... C22C 1/02
420/416

(Continued)

FOREIGN PATENT DOCUMENTS

EP    0783040    7/1997

OTHER PUBLICATIONS

F.A. Schmidt et al., An Inexpensive Method for Preparing $Gd_5(Si_xGe_{1-x})_4$ Magnetocaloric Material by the Carbothermic Method, Thermag III, Iowa State University, Ames, Iowa, May 11-15, 2009.

(Continued)

Primary Examiner — Jie Yang

(57) ABSTRACT

A carbothermic reduction method is provided for reducing a La-, Ce-, MM-, and/or Y-containing oxide in the presence of carbon and a source of a reactant element comprising Si, Ge, Sn, Pb, As, Sb, Bi, and/or P to form an intermediate alloy material including a majority of La, Ce, MM, and/or Y and a minor amount of the reactant element. The intermediate material is useful as a master alloy for in making negative electrode materials for a metal hydride battery, as hydrogen storage alloys, as master alloy additive for addition to a melt of commercial Mg and Al alloys, steels, cast irons, and superalloys; or in reducing $Sm_2O_3$ to Sm metal for use in Sm—Co permanent magnets.

16 Claims, 8 Drawing Sheets

Related U.S. Application Data

(60) Provisional application No. 61/399,943, filed on Jul. 20, 2010.

(51) Int. Cl.
| | | |
|---|---|---|
| *C22C 28/00* | (2006.01) | |
| *H01M 4/24* | (2006.01) | |
| *H01M 4/38* | (2006.01) | |
| *C22C 30/00* | (2006.01) | |
| *H01M 10/30* | (2006.01) | |
| *H01M 10/34* | (2006.01) | |

(52) U.S. Cl.
CPC ............ *H01M 4/242* (2013.01); *H01M 4/383* (2013.01); *H01M 4/385* (2013.01); *H01M 10/30* (2013.01); *H01M 10/345* (2013.01); *Y02E 60/124* (2013.01); *Y02P 70/54* (2015.11)

(58) Field of Classification Search
USPC .......................... 75/610, 710; 420/580, 591
See application file for complete search history.

(56) References Cited

U.S. PATENT DOCUMENTS

| | | | |
|---|---|---|---|
| 4,681,623 A | 7/1987 | Okajima et al. | 75/0.5 B |
| 4,734,130 A * | 3/1988 | Adam et al. | 75/674 |
| 4,837,109 A | 6/1989 | Tokunaga et al. | 420/83 |
| 5,026,419 A | 6/1991 | Iwasaki et al. | 75/254 |
| 5,085,944 A | 2/1992 | Ebato et al. | 428/570 |
| 5,200,001 A | 4/1993 | Hirosawa et al. | 148/302 |
| 5,266,128 A | 11/1993 | Bogatin | 148/101 |
| 5,645,651 A | 7/1997 | Fujimura et al. | 148/302 |
| 5,690,889 A | 11/1997 | McCallum et al. | 420/83 |
| 5,743,095 A | 4/1998 | Gschneidner, Jr. et al. | 62/3.1 |
| 5,811,187 A | 9/1998 | Anderson et al. | 428/403 |
| 5,840,267 A | 11/1998 | Saegusa | 423/592 |
| 6,106,768 A | 8/2000 | Lee et al. | 420/580 |
| 6,589,366 B1 | 7/2003 | Gschneidner, Jr. et al. | 148/301 |
| 6,855,186 B2 | 2/2005 | Rao et al. | 75/371 |
| 7,114,340 B2 | 10/2006 | Pecharsky et al. | 62/3.1 |
| 2002/0050306 A1 | 5/2002 | Nishiuchi et al. | 148/101 |
| 2003/0221750 A1 | 12/2003 | Pecharsky et al. | 148/121 |
| 2004/0168747 A1 | 9/2004 | Tomizawa et al. | 148/104 |
| 2006/0231165 A1 | 10/2006 | Kato et al. | 148/302 |
| 2008/0066575 A1 | 3/2008 | Yang | 75/229 |

OTHER PUBLICATIONS

D. Normile, Haunted by 'Specter of Unavailability' Experts Huddle Over Critical Materials, Science, vol. 330, Dec. 2010, p. 1598.

N. I. Usenko et al., Claorimetric determination of standard molar enthalpies of formation of gadolinium silicicdes and germanides, Journal of Alloys and Compounds 266, 1998, pp. 186-190.

D. Jiles, Introduction to Magnetism and Magnetic Materials, Chapman & Hall, 1991, pp. 299-231.

I.E. Anderson et al., Particulate Processing and Properties of High-Performance Permanent Magnets, International Journal of Powder Metallurgy, vol. 40, 6, 2004, pp. 37-60.

F.H. Spedding and A.H. Daane, The Rare Earths, John Wiley & Sons, 1961, pp. 102-112.

V.K. Pecharsky et al., The Giant Magnetocaloric Effect in $Gd_5(Si_xGe_{1-x})_4$ Materials for Magnetic Refrigeration, Advances in Cryogenic Engineering, vol. 43, 1998, pp. 1729-1736.

F.H. Spedding et al., The Preparation and Properties of "Ultrapre" Metals, Iowa State University, Ames Laboratory Research and Development Report, USAEC, May 1970.

E.R. Stevens and H.A. Wilhelm, Reduction of Niobium Pentoxide by Carbon, Iowa State University, Ames Laboratory, USAEC, Feb. 1961.

B.J. Beaudry et al., "Preparation and Properties of the Rare Earths Metals" in Handbook of the Physics and Chemistry of Rare Earths, edited by K.A. Gschneidner, Jr., and L. Eyring, North Holland Publishing Co., Chapter 2, p. 173, (1978).

W.J. Kroll et al., "Reactions of Carbon and Metal Oxides in a Vacuum", Electrochem. Soc. 93, 247 (1948).

W.A. Wilhelm et al., "Vanadium Metal by Carbon Reduction of Vanadium Oxides", Ames Laboratory, Iowa States University Report IS-2092, 1968.

G. Goll et al., "High-preformance permanent magnets", Naturwissenschften, vol. 87, pp. 423-438 (2000).

Y. Kanazawa et al., "Rare earth minerals and resources in the world", J. of Alloys and Compounds, 408-412, pp. 1339-1343, 2006.

J.F. Herbst, "$R_2Fe_{14}B$ materials: Intrinsic properties and technological aspects", Review of Modern Physics, vol. 63, No. 4, pp. 819-898, Oct. 1991.

G.P. Hatch et al., "Going Green: The Growing Role of Permanent Magnets in Renewable Energy Production and Environmental Protection", presented at the Magnetics 2008 Conference, Denver, Colorado, May 2008.

K.J. Strnat et al., "Rare earth-cobalt permanent magnets", Journal of Magnetism and Magnetic Materials, 100, pp. 38-56, 1991.

M. Sagawa et al., Permanent Magnet Materials Based on the Rare Earth-Iron-Boron Tetragonal Compounds (Invited), IEEE Transactions on Magnetics, vol. Mag 20, No. 5, pp. 1584-1589, Sep. 1984.

* cited by examiner

METHOD FOR PRODUCING LA/CE/MM/Y BASE ALLOYS, RESULTING ALLOYS AND BATTERY ELECTRODES

RELATED APPLICATION

This application is a continuation of international PCT application No. PCT/US2011/001277 filed Jul. 19, 2011, which claims benefits and priority of U.S. provisional application Ser. No. 61/399,943 filed Jul. 20, 2010, the entire disclosures of which are incorporated herein by reference.

CONTRACTUAL ORIGIN OF THE INVENTION

This invention was made with government support under Grant No. DE-AC02-07CH11358 awarded by the Department of Energy. The Government has certain rights in the invention.

FIELD OF THE INVENTION

The present invention relates rare earth-based alloys comprising a majority of a rare earth selected from lanthanum (La), cerium (Ce), mischmetal (MM), and/or yttrium (Y) and to a method of making the alloys by carbothermic reduction of a La-, Ce-, MM- and/or Y-containing oxide, and to battery electrodes comprised of such rare earth-based alloys.

BACKGROUND OF THE INVENTION

Researchers over the last 100 years have made various attempts to process pure refractory and rare earth metals and alloys by the carbothermic process. The driving force for all of these investigations has been the low cost of carbon as the reducing agent (reductant) and the simplicity of processing with no slag formation. Some success was achieved by these workers, but high purity materials were not obtained and consistently contained large amounts of carbon (usually as metallic carbides), unreduced oxides, and other interstitials.

In the manufacture of nickel metal hydride batteries, a commonly used alloy for the negative electrode [where hydrogen ions (protons) are stored as metal hydride] comprises $La(Ni,Co)_{4.5}Si_{0.5}$. The negative electrode alloy can be prepared by reacting a La-based alloy $LaSi_{0.5}$ with nickel (Ni) and cobalt (Co) in direct proportions which are usually close to equal amounts of Ni and Co.

Mischmetal (MM) comprises a majority of La, Ce collectively and minor amounts of other rare earth elements depending on the source of the ore. MM also can be used in the nickel metal hydride battery electrode such that the above-described reaction using a MM-based alloy also applies for preparing $MM(Ni_{1-x}Co_x)Si_{0.5}$ electrode materials.

A discussion of materials for metal-hydrogen batteries is provided by T. Sakai, M. Matsuoka and C. Iwakura, "Rare Earth Intermetallics for Metal-Hydrogen Batteries," in *Handbook on the Physics and Chemistry of Rare Earths*, Ed. K. A. Gschneidner, Jr. and L. Eyring, Vol. 21, Chap. 142, pp. 133-178 (1995).

There is a need to prepare La based alloys from $La_2O_3$ in a manner that is less expensive than current processes, which use calcium (Ca) as a reducing agent or which involve electrolytic reduction of $LaF_3$ or $LaCl_3$ to La metal with high consumption of electricity.

SUMMARY OF THE INVENTION

The present invention provides in an embodiment, a carbothermic reduction method wherein a La- and/or Ce-containing oxide is/are carbothermically reduced in the presence of carbon and a source of a reactant element X selected from the group consisting of silicon (Si), germanium (Ge), tin (Sn), lead (Pb), arsenic (As), antimony (Sb), bismuth (Bi), and phosphorous (P) to form an intermediate alloy material comprised of a majority of La and/or Ce and a minor amount of X wherein X is selected from the group consisting of silicon (Si), germanium (Ge), tin (Sn), lead (Pb), arsenic (As), antimony (Sb), bismuth (Bi), and phosphorous (P). Other oxides such as MM-containing oxide and/or Y-containing oxide can be similarly carbothermically reduced pursuant to other embodiments of the invention to produce MM-based alloys or Y-based alloys. The rare earth-based alloy material of a particular embodiment of the invention can include X, such as Si, in minor amount from about 5 to about 50 atomic %, such as commonly about 5 to about 40 atomic % X, with the majority of the alloy (greater than 50 atomic %) being La, Ce, MM, and/or Y. The source of the reactant element can comprise elemental Si, Ge, Sn, Pb, As, Sb, Bi, and/or P, the oxides thereof, and/or other compounds thereof, that can participate in the carbothermic reduction reaction to form the intermediate material.

This intermediate rare earth-based material is useful as a master alloy in making a negative electrode material (as a hydrogen storage component) for a metal hydride battery. For example, the present invention provides in another embodiment, a method wherein the carbothermically reduced La-, Ce-, or MM-based intermediate alloy material including Si (as a master alloy) is alloyed with a transition metal such as Ni to make an electrode material for a metal hydride battery. The present invention in embodiments include a negative electrode comprising a carbothermically reduced rare earth element including La, Ce, and/or MM, an element selected from the group consisting of Si, Ge, Sn, Pb, As, Sb, Bi, and P that participated in the carbothermic reduction of the rare earth element, and a transition metal such as Ni, which may be partially substituted by one or more other elements such as including, but not limited to, Co.

The intermediate rare earth-based material also is useful as a master alloy in reducing $Sm_2O_3$ to samarium metal (Sm) for use in Sm—Co permanent magnets, or other Sm-metal containing products.

The intermediate rare earth-based material also is useful as a master alloy additive to a melt of commercial Mg and Al alloys, steels, cast irons, and superalloys to introduce the rare earth element into the melt.

Advantages of the present invention will become more readily apparent from the following detailed description taken in conjunction with the following drawings.

DETAILED DESCRIPTION OF THE INVENTION

Figure 1:
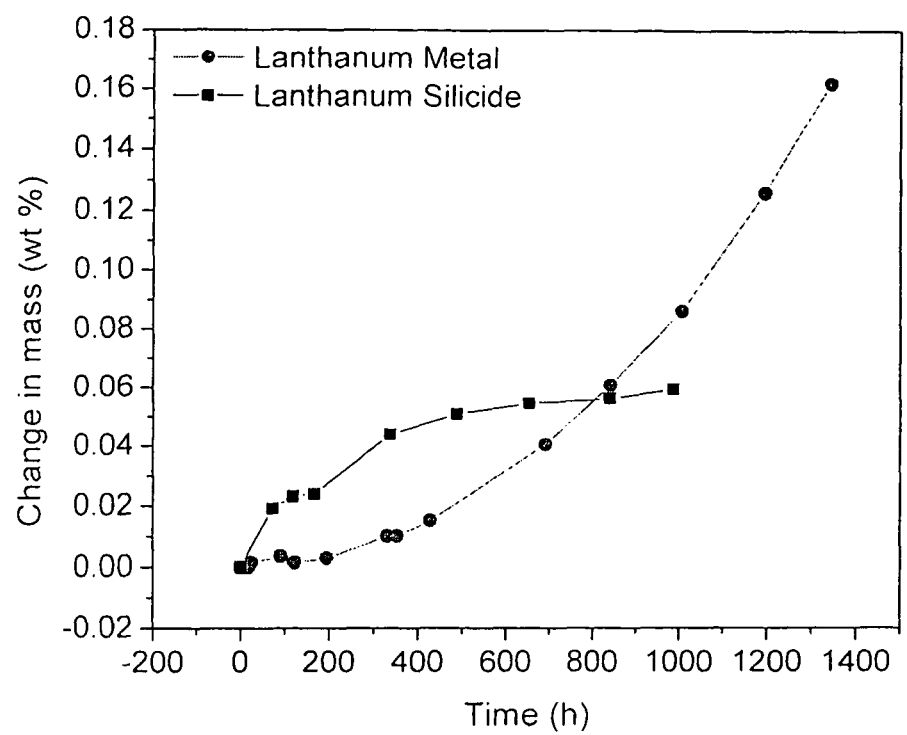
FIG. 1 is a plot of the oxidation of $La_5Si_{2.5}$ at ambient room temperature.

The present invention provides in an embodiment a carbothermic reduction method for reducing a La- and/or Ce-containing oxide at temperatures below 1800 degrees C. and above about 1300 degrees C. The La- and/or Ce-containing oxide is reduced in the presence of carbon (reducing agent) and a source of a reactant element X described below in order to form a La- and/or Ce-based intermediate alloy material. While not wishing to be bound by any theory, it is believed that the reactant element catalyzes, and/or acts as a flux, and/or otherwise participates chemically in the carbothermic reduction of the rare earth oxide. The La- and/or Ce-containing oxide can include $La_2O_3$, $CeO_2$, mixtures of $La_2O_3$ and $CeO_2$, and mischmetal (MM) oxides that have a majority concentration of $La_2O_3$ and $CeO_2$ collectively and other rare earth oxides, such as $Pr_6O_{11}$ and $Nd_2O_3$, depending on the source of the ore. Other rare earth elements such as Pr and/or Nd as well as non-rare earth elements such as Zr could be substituted for a portion of the rare earth constituent, and thus their oxides would be co-reduced with $La_2O_3$ and/or $CeO_2$.

The carbothermic reduction process is a solid state, diffusion controlled process and intimate contact between the carbon reducing agent and the oxide particles and source of a reactant element X selected from the group consisting of Si, Ge, Sn, Pb, As, Sb, Bi, and P is employed for the reduction to reach completion. The optimum particle size of the La and/or Ce-containing oxide, carbon, and source of the Si, Ge, Sn, Pb, As, Sb, Bi, and/or P reactant element and the best conditions for milling and blending the mixture thereof can be determined empirically to this end. The Examples below illustrate certain exemplary parameters for carrying out the carbothermic reduction reaction.

Although Example 1 described below starts with $La_2O_3$, the invention can be practiced using oxides of La, Ce, MM (which can include Nd and/or Pr) and/or Y (see Examples 2, 3 and 4, respectively) using similar reaction temperatures and times as set forth below. The fine $La_2O_3$ powder is mixed and blended with carbon and Si, (both are also fine powders), formed into a paste by adding acetone containing 3 wt. % polypropylene carbonate as a binder, and formed into briquettes which are air dried at 100° C. for a few hours. The briquettes are heated in a vacuum furnace for example capable of a vacuum of $5\times10^{-5}$ Torr or less in various steps until about 1700° C. when the entire mixture is melted for a time to react C and O to reduce their content in the alloy. The by-products are CO and a small amount of SiO gas. The resultant ingot when cooled is a $LaSi_x$ alloy and may contain about 5 atomic % to as much as about 50 atomic % Si (about 18 wt. % Si), such as commonly about 5 atomic % to about 40 atomic % Si. The one-step method of the invention is much cheaper than current processes for making La metal because carbon is a much less expensive reducing agent than Ca; and in the case of an electrolytic method, the cost of electricity to reduce $LaF_3$ and/or $LaCl_3$ to La metal is quite high. Furthermore, it is a much more environmentally friendly technology because in the other reduction methods $CaF_2$ or $CaCl_2$ slag is produced and must safely be returned to the environment; while in the electrolysis method the byproduct is the hazardous fluorine ($F_2$) gas. In the carbothermic-silicide method of the invention, the CO by-product can be used as a starting material for preparing organic compounds or as a component of producer gas (also known as water gas) for the cogeneration of heat or electricity.

It is noted that although this description provides some specific examples of rare earths, such as La, Ce, and Y, the principles of the present invention can be applied to other rare earth elements. For example, in some embodiments, the carbothermic reduction method can be used to reduce oxides that include one or more of Sc, Y, La, Ce, Pr, Nd, Gd, Tb, Dy, Ho, Er, and Lu, and consequently, in embodiments, the intermediate alloy generated from the carbothermic reaction (and any other products generated from the intermediate alloy such as an electrode of a battery) can include one or more of Sc, Y, La, Ce, Pr, Nd, Gd, Tb, Dy, Ho, Er, and Lu.

A master starting alloy produced by carbothermic-catalytic reduction includes commonly from about 70 to about 98 wt. %, more commonly from about 75 to about 95 wt. %, and even more commonly from about 80 to about 90 wt. % rare earth; commonly from about 2 to about 35 wt. %, more commonly from about 5 to about 30 wt. %, and even more commonly from about 10 to about 25 wt. % reactant element; and commonly from about 0.005 to about 2 wt. %, more commonly from about 0.05 to about 1.5 wt. %, and even more commonly from about 0.5 to about 1 wt. % carbon, oxygen, and nitrogen (individually and collectively).

In the master starting alloy, a molar ratio of rare earth to reactant element typically ranges from about 1:1 to about 3:1, more typically from about 1.1:1 to about 2.5:1, and even more typically from about 1.2:1 to about 2:1.

While not wishing to be bound by any theory, the chemical reactions of the carbothermic-silicide method of illustrative embodiments of the invention can be described as follows:

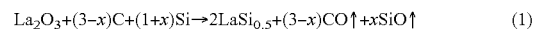

$$La_2O_3+(3-x)C+(1+x)Si\rightarrow 2LaSi_{0.5}+(3-x)CO\uparrow+xSiO\uparrow \quad (1)$$

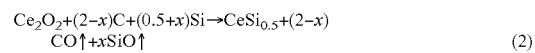

$$Ce_2O_2+(2-x)C+(0.5+x)Si\rightarrow CeSi_{0.5}+(2-x)CO\uparrow+xSiO\uparrow \quad (2)$$

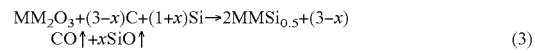

$$MM_2O_3+(3-x)C+(1+x)Si\rightarrow 2MMSi_{0.5}+(3-x)CO\uparrow+xSiO\uparrow \quad (3)$$

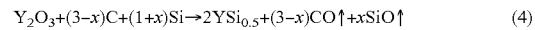

$$Y_2O_3+(3-x)C+(1+x)Si\rightarrow 2YSi_{0.5}+(3-x)CO\uparrow+xSiO\uparrow \quad (4)$$

The resulting $LaSi_{0.5}$ of Eq. (1) provides a master starting alloy for making a variety of products. While not wishing to be bound by any theory, in making a Ni metal hydride battery, a common alloy used for the negative electrode (hydrogen absorbing electrode where oxidation occurs during battery discharge) is $La(Ni,Co)_{4.5}Si_{0.5}$, which can be prepared by reacting $LaSi_{0.5}$ with the Ni and Co (in the correct proportions, usually close to equal amounts of Ni and Co):

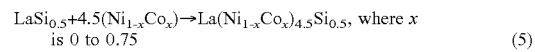

$$LaSi_{0.5}+4.5(Ni_{1-x}Co_x)\rightarrow La(Ni_{1-x}Co_x)_{4.5}Si_{0.5}, \text{ where } x \text{ is 0 to 0.75} \quad (5)$$

Since MM is also used in the Ni metal hydride batteries, this reaction also applies for making $MM(Ni_{1-x}Co_x)_{4.5}Si_{0.5}$ electrode materials where MM is La, Ce and other rare earth elements.

Chemical reactions involving $CeO_2$ and $MM_2O_3$ of Eq. (2) and (3) will result in $CeSi_{0.5}$ and $MMSi_{0.5}$ master start alloys for making a variety of products. These include;

CeSi$_{0.5}$ and MMSi$_{0.5}$ alloys as additives to Mg- or Al-based alloys, steels, cast irons, and ductile irons; and MMSi$_{0.5}$ for the manufacture of lighter flints. Similarly one can use Y$_2$O$_3$ to make YSi$_{0.5}$ of Eq. (4) as a master start alloy for Y additions to superalloys to inhibit oxidation and corrosion of the superalloys, and to Mg-base alloys to improve the high temperature creep resistance of the Mg-base alloys.

The LaSi$_{0.5}$ (or CeSi$_{0.5}$) alloy also may be used as a reducing agent to prepare Sm metal as the starting material for making SmCo$_5$/Sm$_2$Co$_{17}$ permanent magnet materials. While not wishing to be bound by any theory, the chemical reaction for preparing the Sm metal from LaSi$_{0.5}$ is as follows:

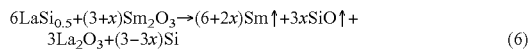

$$6\text{LaSi}_{0.5}+(3+x)\text{Sm}_2\text{O}_3 \rightarrow (6+2x)\text{Sm}\uparrow+3x\text{SiO}\uparrow+ \\ 3\text{La}_2\text{O}_3+(3-3x)\text{Si} \quad (6)$$

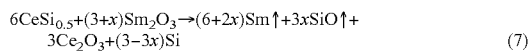

$$6\text{CeSi}_{0.5}+(3+x)\text{Sm}_2\text{O}_3 \rightarrow (6+2x)\text{Sm}\uparrow+3x\text{SiO}\uparrow+ \\ 3\text{Ce}_2\text{O}_3+(3-3x)\text{Si} \quad (7)$$

Free Si will be one of the final products because the free energy of formation at 1300 K of La$_2$O$_3$ (or CeSi$_{0.5}$) is nearly twice as negative as SiO$_2$ (−430 vs. −244 kcal/mole). The boiling point of Si is essentially the same as La at about 3270° C. such that it will not sublime and will not contaminate the Sm metal. However, SiO may form; and it is a gas which possibly may co-sublime with the Sm. It may be possible to minimize the SiO formed and co-sublimed with the Sm. It is also possible that small amounts of Si and oxygen (O) will have no appreciable deletious affect on the magnetic properties of SmCo$_5$/Sm$_2$Co$_{17}$.

Reaction (6) above contrasts to the current process used in the art, which process involves mixing La (or Ce) metal with Sm$_2$O$_3$. Because of the large vapor pressure differences (boiling point of Sm is 1794° C. and that of La is 3464° C. [Ce—3433° C.]), the Sm metal vaporizes leaving behind La$_2$O$_3$ (or CeO$_x$, where 1.5≥x≥2.0). The reduction/sublimation is carried out at about 800° C.

Another possible advantage of the reduction method of the invention is to reuse the La$_2$O$_3$ (or CeO$_x$)+Si product in the first step to prepare the LaSi$_{0.5}$ (or CeSi$_{0.5}$) material (Eq. 1) but less Si needs to be added since there is free Si in the La$_2$O$_3$ (CeO$_x$) product from Eq. 6. If the La$_2$O$_3$ (CeO$_x$)+Si cannot be reused, the mixture can be dissolved in an aqueous solution, and the La can be separated from the Si, and converted to La$_2$O$_3$ (CeO$_x$) by conventional chemical procedures. Essentially all of the La$_2$O$_3$ (CeO$_x$) is reused, regardless which recovery process is used.

This intermediate rare earth-based alloy is useful as a master alloy in making a negative electrode material for a metal hydride battery, such as including but not limited to, R(Ni$_{1-x}$Co$_x$)Si$_{0.5}$ where R is La, Ce, and MM and x=0 to 0.75. For example, the present invention provides in an illustrative embodiment, a method wherein the La-, Ce-, or MM-based intermediate alloy material including Si (as a master alloy) is reacted (alloyed) with a transition metal such as including, but not limited to, Ni alone or Ni with some portion of the Ni optionally substituted by at least one of B, Al, Si, Ti, V, Cr, Mn, Co, Fe, Cu, Zn, and Mo to make an electrode material for a metal hydride battery. To this end, the electrode comprises the carbothermically reduced rare earth, Si (or other element selected from the group consisting of Ge, Sn, Pb, As, Sb, Bi, and P) that participated in the carbothermic reduction of the oxide, and the transition metal.

The electrode material incorporating the carbothermically reduced rare earth and one or both of nickel and cobalt can be incorporated into an electrode using known techniques. The electrode material can be melted and processed for example by spin casting or other rapid cooling process that allow for controlled crystallite growth. The cooled material can then be ground into a powder and mixed with one or more binders. The material can then be pressed, for example on a wire grid or mesh, which can then be included in the battery as an electrode, e.g., an anode.

The carbothermic reactions involve the use of a reactant element, such as one or more elements of Groups IVA (other than carbon), VA of the Periodic Table of the Elements, oxides thereof, and/or other compounds thereof. By way of example, in Reactions (1)-(4) silicon is the reactant element for carbothermic reduction of a rare earth oxide. As a result, the intermediate rare earth-based alloy may include some of the reactant element, e.g., one or more of silicon, germanium, tin, lead, phosphorus, arsenic, antimony, bismuth, and any products generated from the intermediate rare earth-based alloy may also include the reactant element. For example, an electrode of a battery that incorporates material generated from the intermediate rare earth-based alloy may include a reactant element in the carbothermic reaction.

Embodiments of the present invention include an electrode of a battery that includes a rare earth that has been carbothermically reduced as described above. As noted above, the electrode may include an alloy with the formula MM(Ni$_{1-x}$Co$_x$)$_{4.5}$Si$_{0.5}$ where MM is La, Ce and/or other rare earth elements. In this formula, x ranges from about 0 to about 0.75.

However, the present invention is not limited to any particular stoichiometric composition and may in embodiments include alloys with different compositions. For example, in some embodiments the alloy used in an electrode, particularly the anode, of a battery includes commonly at least about 10 wt. %, more commonly at least about 15 wt. %, more commonly at least about 20 wt. %, and even more commonly at least about 30 wt. % of one or both of nickel and cobalt. In some embodiments, the alloy includes commonly up to about 70 wt. %, more commonly up to about 45 wt. %, more commonly up to about 40 wt. %, and even more commonly up to about 35 wt. % of one or both of nickel and cobalt. In some embodiments, the alloy includes commonly at least about 5 wt. %, more commonly at least about 10 wt. %, more commonly at least about 15 wt. %, and even more commonly at least about 20 wt. % of one or more rare earths. In some embodiments, the alloy includes commonly up to about 35 wt %, more commonly up to about 40 wt %, more commonly up to about 45 wt % or even more commonly up to about 50 wt % of the rare earth. In some embodiments, the alloy used in an electrode of a battery includes between about 20 wt % to about 50 wt % of the rare earth. In some embodiments, the alloy used in an electrode of a battery includes commonly at least about 0.5 wt. %, more commonly at least about 1 wt. %, more commonly at least about 2 wt. %, more commonly at least about 3 wt. %, and even more commonly at least about 4 wt. % of the reactant element. In some embodiments, the alloy includes commonly up to about 5 wt %, more commonly up to about 15 wt %, more commonly up to about 25 wt %, or even more commonly up to about 30 wt % of the reactant element. In one embodiment, the alloy used in an electrode of a battery includes between about 0.5 wt % to about 20 wt % of the reactant element.

The following Examples are offered to illustrate but not limit the invention:

Example-1

Preparation of $La_5Si_{2.5}$ by a Carbothermic-Silicide Method for Nickel-Metal (Lanthanum) Hydride Batteries and Hydrogen Storage Alloys Preparation of Briquettes A $La_5Si_{2.5}$ alloy was prepared by carbothermic processing. For example, approximately 100 grams of $La_2O_3$ were obtained from the Materials Preparation Center at the Ames Laboratory (U.S. Department of Energy) (e.g. purity of 95 to 98%) and dried in air for 20 hours at 800° C. A 50.0 gram amount of this oxide was added to 4.5 grams of carbon. The Si was obtained from the Arco Solar Corporation (purity of 99.9% but less pure can be used) and the carbon was obtained from Chevron Chemical and was of the Shawenigan (acetylene black) type, 100% compressed, −325 mesh and contained less than 0.05% ash. This mixture was then blended for 2½ hours using a Turbo Blender and mixed with 44 grams of acetone containing 3 wt. % polypropylene carbonate (QPAC) to form a pliable mass. Briquettes measured 6 mm thick and ~13×13 mm were formed, air dried at 100° C. for 2 hours and then stored under vacuum to prevent hydrolysis and $CO_2$ absorption.

Carbothermic Reduction [FRS-43-147RC(La)] to Prepare $La_5Si_{2.5}$

A 31.5 gram portion of the dried briquettes contained $La_2O_3$, Si and carbon (97.5% of stoichiometry) were placed in a 4.1 cm diameter×6.4 cm high tantalum (Ta) metal crucible and heated under vacuum using a mechanical vacuum pump to 1600° C. and then to 1790° C. for 2 hours using both a mechanical vacuum pump and a diffusion vacuum pump (200 to 600 µm max pressure). The heating schedule was as follows:

Heat @ 20° C./min. to 1100° C. and hold for 6 min.
Heat @ 10° C./min. to 1400° C. and hold for 6 min.
Heat @ 10° C./min. to 1600° C. and hold for 1.5 hrs.
Valve in diffusion pump and heat @ 10° C./min. to 1790° C. and hold for 2 hrs.
Cool @ 10° C. to 1600° C.
Cool @ 30° C./min. to room temperature.

The prepared alloy was then removed from the Ta crucible and submitted for chemical analysis and scanning electron microscopic (SEM) analysis to determine the ratio of La to Si. An x-ray analysis was also made.

The alloy was found to contain 0.64 wt. % carbon (C), 0.47 wt. % oxygen (O) and 0.007 wt. % nitrogen (N). The SEM analysis showed it to contain an overall La to Si ratio of 5 to 2.5. A mix of La silicides was found to be present which was confirmed by the x-ray analysis. X-ray analysis showed that $La_3Si_2$, $La_5Si_3$ and $La_5Si_4$ were present along with small amounts of $La_2O_3$ and silicon, no SiC was observed.

The alloy was placed in water for 6 hours, and just a slight reaction was observed indicating the presence of a small amount of some lanthanum carbide.

The oxidation of this alloy at room temperature is shown in FIG. 1 along with that of a commercial grade La metal. The oxidation resistance is quite low; i.e. a 0.06 weight percent gain after exposure to ambient air for 1000 hours (more than 40 days) and is comparable to that of normal La metal.

Preparation of $LaNi_{2.25}Co_{2.25}Si_{0.5}$ (KAA-1-62)

The starting materials were $La_5Si_{2.5}$ (FRS-43-147 from above), as well as elemental Ni and Co. A 14.7 g button of the stoichiometric composition was prepared by arc melting in a partial pressure of argon (Ar). The sample was melted four times at 275 amperes and flipped over between each melt. There was minimal weight loss during the melting process. The button was then drop cast at 450 amperes into a chilled copper mold. After drop casting, a 3 gram portion of the sample was lightly crushed and passed through a 600 µm sieve for hydrogenation. Rietveld refinement of the x-ray diffraction (XRD) powder pattern showed that the major phase has the $LaNi_5$ structure.

Figure 2:
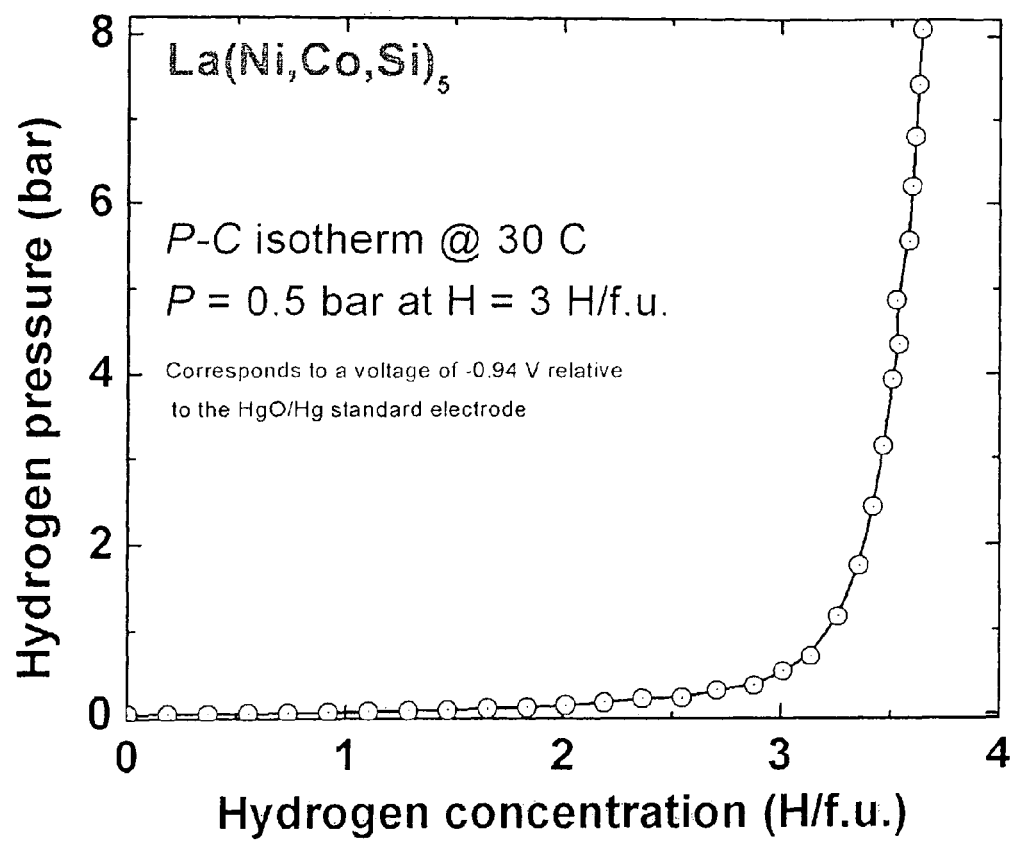
FIG. 2 is a pressure-composition of the hydrogenation [hydrogen (H) content as a function of hydrogen pressure] of an electrode material, $La(Ni, Co, Si)_5$ where Y may be B, Al, Si, Ti, V, Cr, Mn, Fe, Cu, Zn, Mo, or combinations thereof made pursuant to an embodiment of the invention.

The $LaNi_{2.25}CO_{2.25}Si_{0.5}$ alloy can be utilized as the negative electrode of a Ni-metal-hydride battery, or as a hydrogen storage alloy The hydrogenation pressure-composition diagram is shown in FIG. 2. The plateau pressure of 0.5 bar and 3H/formula unit corresponds to a voltage of −0.94 V relative to the mercury oxide/mercury (HgO/Hg) standard electrode.

Figure 3:
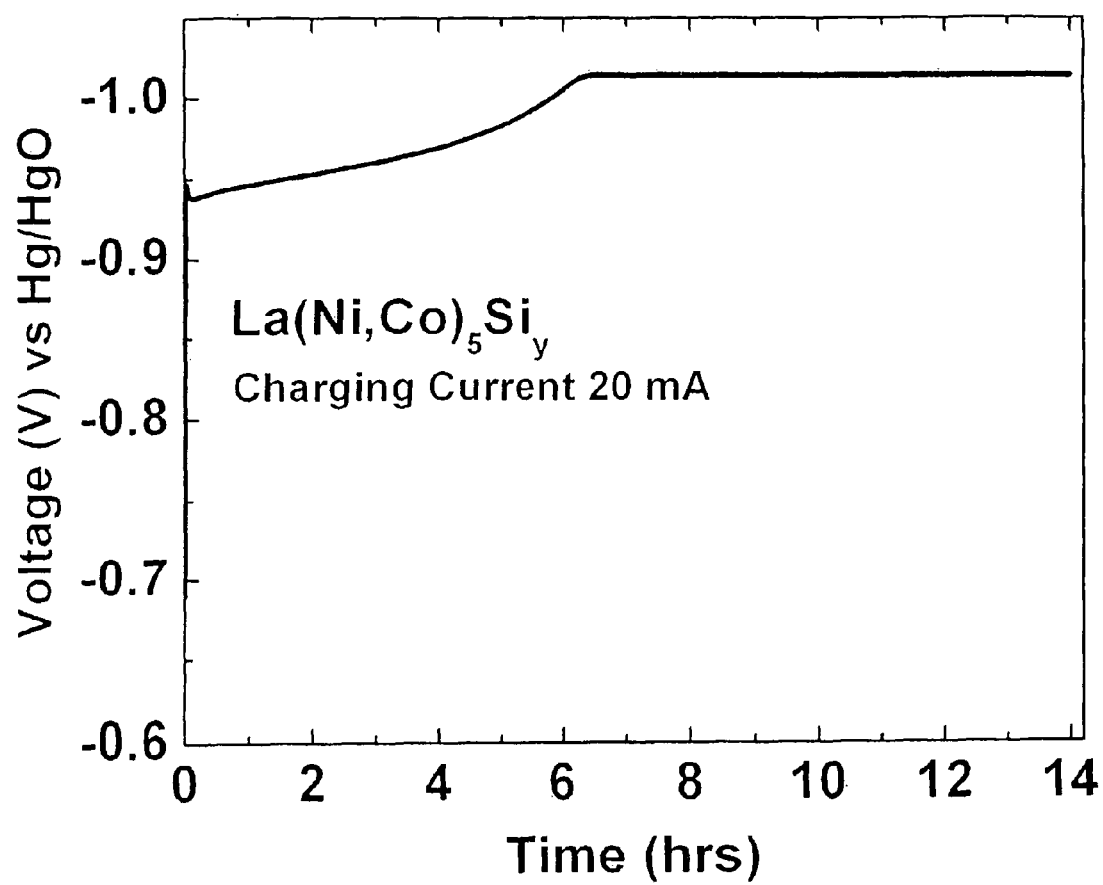
FIG. 3 is a plot of voltage versus time showing the charging behavior at a current of 20 mA over a 14 hour period of an electrode pursuant to an illustrative embodiment of the invention.
Figure 4:
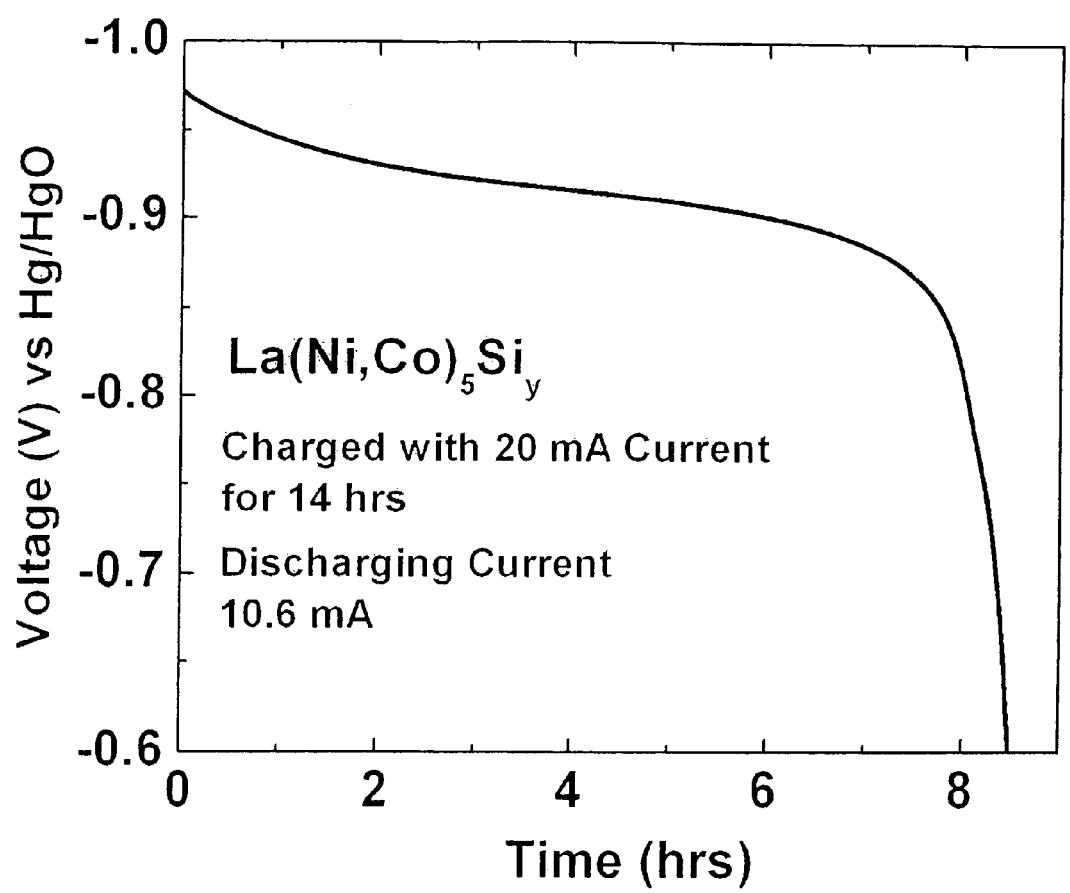
FIG. 4 is a plot of voltage versus time showing the discharging characteristics for a discharging current of 10.6 mA for the electrode of FIG. 2.
Figure 5:
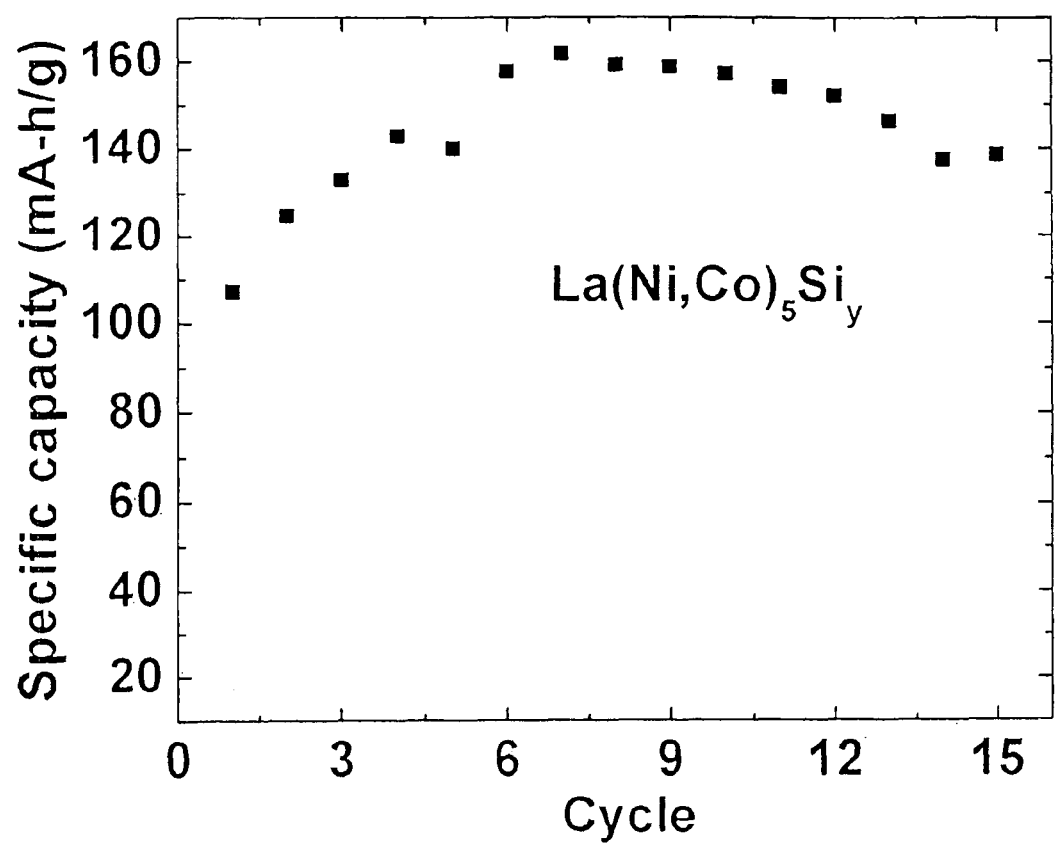
FIG. 5 is a plot of specific capacity versus cycles showing the capacity of a test cell as a function of the number of charging/discharging cycles.

The electrical properties of the $LaNi_{2.25}CO_{2.25}Si_{0.5}$ (LaNiCoSi) electrode material were also measured, see FIGS. 3-5. A electrode was prepared by blending the LaNi-CoSi powder with silver powder. The LaNiCoSi was crushed and screened to a 45 µm particle size, mixed with 0.5-1.0 µm silver powder at a 2:1 (LaNiCoSi:Ag) weight ratio, and compressed at a pressure of ~1.5 metric tons at room temperature to provide an irregular shaped plate electrode. The silver powder was incorporated in the electrode as an electrically conductive binder, although copper powder or other suitable binder can be used to this end as well.

The electrode maintained its structural integrity during all of the electrical measurements in a test battery cell that comprised a positive electrode comprised of Ni oxyhydroxide and a negative electrode (the hydrogen absorbing electrode) comprised of the compressed LaNiCoSi powder with silver powder using a 6 molar KOH solution electrolyte. Testing was conducted at room temperature.

FIG. 3 shows the charging behavior at a current of 20 mA over a 14 hour period for the tested electrode.

FIG. 4 shows the discharging characteristics for a discharging current of 10.6 mA for the tested electrode.

FIG. 5 shows the capacity of the testing cell as a function of the number of charging/discharging cycles.

Example-2

Preparation of $Ce_5Si_{2.6}$ by a Carbothermic-Silicide Method as a Master Alloying Agent The preparation of the $CeO_2$+carbon+Si briquettes is the same as described above for $La_2O_3$, except that commercial grade purity $CeO_2$ was used instead of $La_2O_3$ and the amounts of carbon and Si were adjusted to the proportions required according to chemical reaction (2).

Carbothermic Reduction [KAA-1-185RC(Ce)] to Prepare $Ce_5Si_{2.6}$ as a Master Alloying Agent A set of briquettes weighing 61.1 g containing $CeO_2$, Si and carbon were placed in a Ta crucible of the same dimensions as described above in Example 1 for La, and heated under vacuum using a mechanical vacuum pump to 1600° C. and then to 1790° C. for 2 hours using both a mechanical vacuum pump and a diffusion vacuum pump (200 to 600 µm max pressure). The heating schedule was as follows:

Heat @ 20° C./min. to 1100° C. and hold for 6 min.
Heat @ 20° C./min. to 1400° C. and hold for 6 min.
Heat @ 10° C./min. to 1600° C. and hold for 1.5 hrs.
Valve in diffusion pump and heat @ 10° C./min. to 1790° C. and hold for 2 hrs.
Cool @ 10° C. to 1600° C.
Cool @ 30° C./min. to room temperature.

The prepared alloy was then removed from the Ta crucible. An x-ray analysis showed that this sample contained a mix of Ce silicides—5:3, 3:2, 5:4, 1:1 and 1:2 (Ce:Si ratios).

The alloy was found to contain 0.60 wt. % carbon (C), and 0.46 wt. % oxygen (O). The alloy was placed in water for a day and no bubbles of gas were observed indicating that no Ce carbides were formed.

The master alloy can be utilized as an alloying agent or additive to improve the metallurgical properties of commercial Mg and Al alloys, cast irons and superalloys, and as a refining agent for steels.

Figure 6:
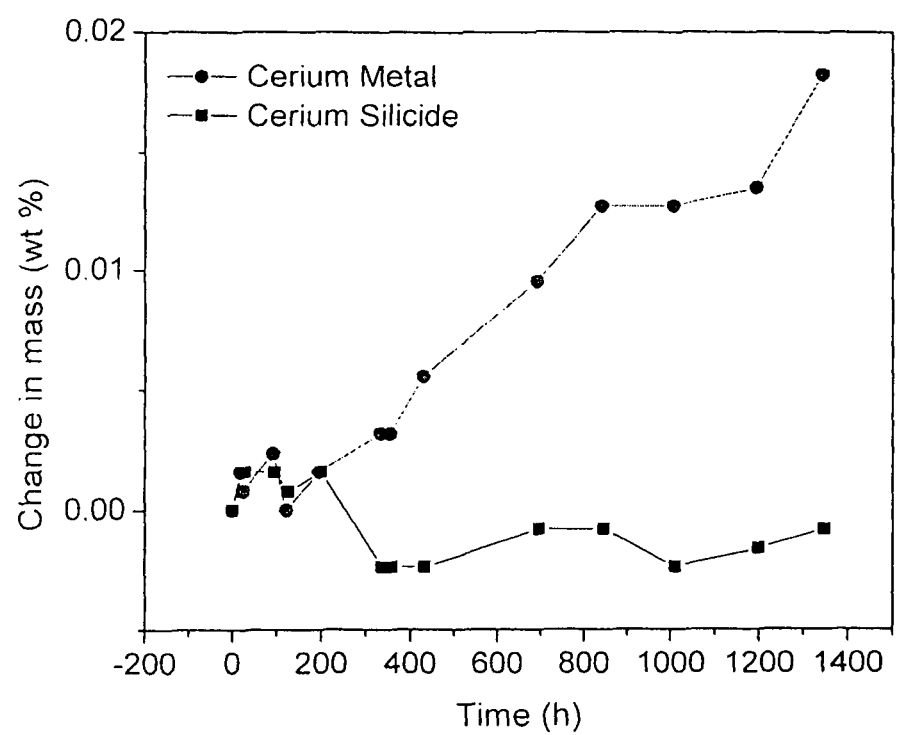
FIG. 6 is a plot of the oxidation of $Ce_5Si_{2.6}$ at ambient room temperature.

This $Ce_5Si_{2.6}$ alloy is extremely oxidation resistant, much more so than commercial grade Ce metal, see FIG. 6. Within experimental error there was no weight gain when exposed to ambient air for more than 1350 hours (56 days).

Example-3

Preparation of $MM_4Si_3$ by a Carbothermic-Silicide Method as a Master Alloying Agent The starting mixed rare earth oxide had a majority of La oxide and Ce oxide collectively with minor amounts of other oxides as shown below:

| Oxide | Wt. % |
|---|---|
| $La_2O_3$ | 27.1 |
| $CeO_2$ | 55.8 |
| $Pr_2O_3$ | 5.3 |
| $Nd_2O_3$ | 11.7 |
| $Sm_2O_3$ | 0.05 |
| $Gd_2O_3$ | 0.01 |
| $Y_2O_3$ | 0.01 |

This mixture is designated as $MM_2O_3$, where MM=mischmetal.

The preparation of the $MM_2O_3$+carbon+Si briquettes is the same as described above for $La_2O_3$, except that commercial grade purity $MM_2O_3$ was used instead of $La_2O_3$ and the amounts of carbon and Si were adjusted to the proportions required according to chemical reaction (1).

Carbothermic Reduction [KAA-1-211RC(MM)] to Prepare $MM_5Si_3$ as a Master Alloying Agent A set of briquettes weighing 61.3 g containing $MM_2O_3$, Si and carbon were placed in a Ta crucible of the same dimensions as described above in Example 1 for La, and heated under vacuum using a mechanical vacuum pump to 1600° C. and then to 1790° C. for 2 hours using both a mechanical vacuum pump and a diffusion vacuum pump (200 to 600 μm max pressure). The heating schedule was as follows:

Heat @ 20° C./min. to 1100° C. and hold for 6 min.
Heat @ 20° C./min. to 1400° C. and hold for 6 min.
Heat @ 10° C./min. to 1600° C. and hold for 1.5 hrs.
Valve in diffusion pump and heat @ 10° C./min. to 1790° C. and hold for 2 hrs.
Cool @ 10° C. to 1600° C.
Cool @ 30° C./min. to room temperature.

The prepared alloy was then removed from the Ta crucible, and was found to contain 0.55 wt. % carbon (C), and 0.66 wt. % oxygen (O). The alloy was placed in water for a day and no bubbles of gas were observed indicating that no Ce carbides were formed.

The $MM_5Si_3$ can be alloyed with a Ni master alloy to form $MMNi_{4.5}Si_{0.5}$, which can be utilized as a negative electrode of a Ni-metal-hydride battery or as a hydrogen storage alloy, i.e. replacement for La described above under Example 1. The Ni-metal-hydride battery electrode can include a minor amount of Pr, Nd, Sm, Gd, and/or Y that originates from the particular MM ore used. The $MM_5Si_3$ alloy may be alloyed with Fe to manufacture lighter flints, and can be utilized as an alloying agent to improve the metallurgical properties of commercial Mg and Al alloys, cast irons and ductile iron, and as a refining agent for steels.

Figure 7:
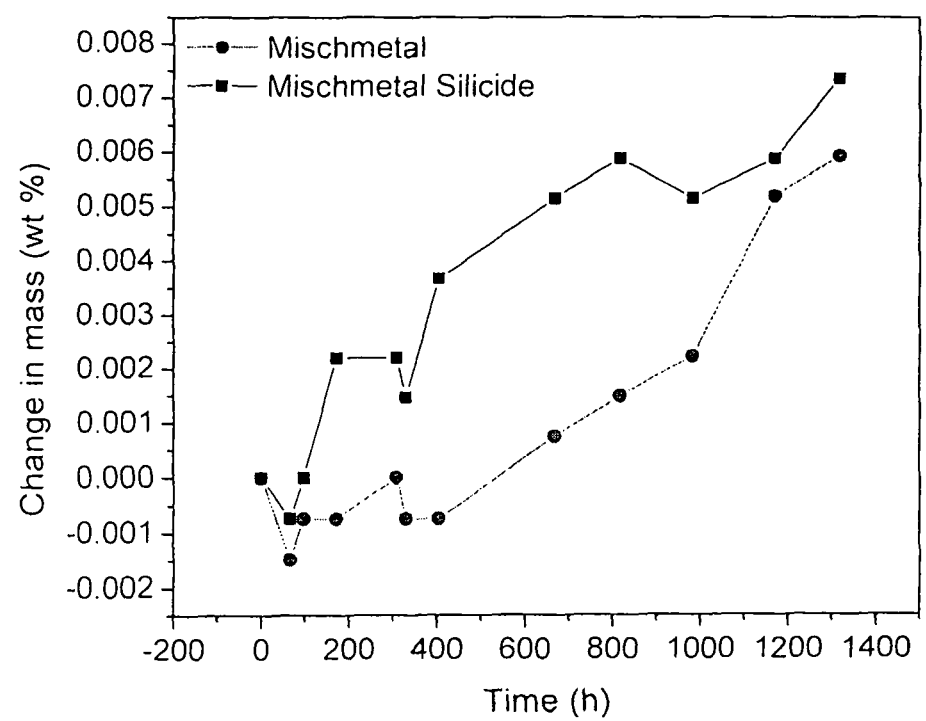
FIG. 7 is a plot of the oxidation of $MM_5Si_3$ at ambient room temperature.
Figure 8:
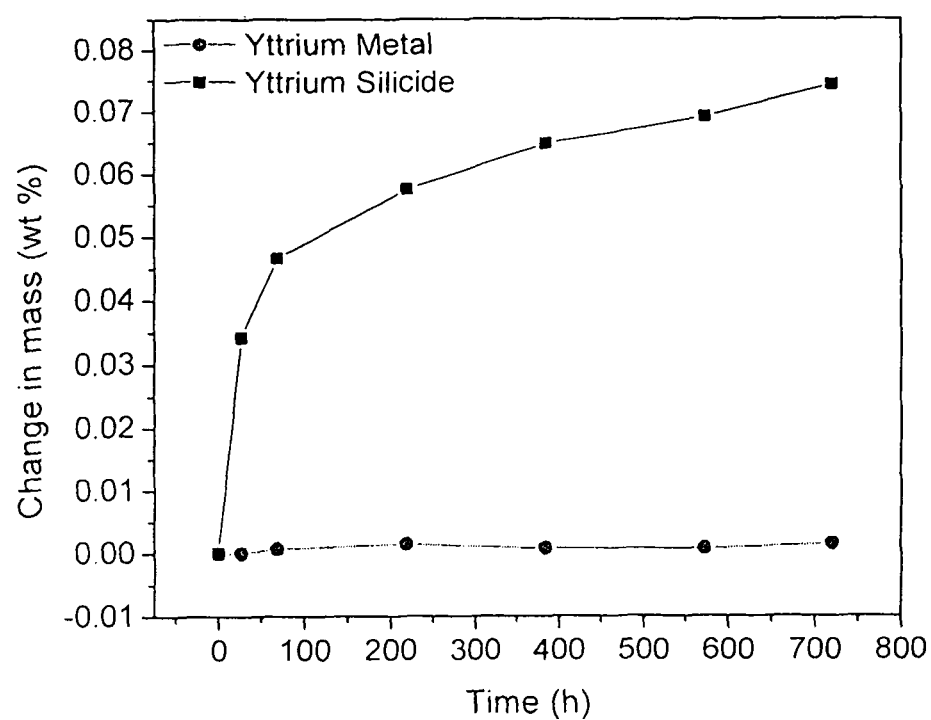
FIG. 8 is a plot of the oxidation of $Y_5Si_{2.6}$ at ambient room temperature.

This $MM_5Si_3$ alloy is quite oxidation resistant, about the same as commercial grade MM, see FIG. 7. The weight gain was quite small, ~0.008%, when exposed to ambient air for more than 1350 hours (56 days).

Example-4

Preparation of $Y_5Si_{2.6}$ by a Carbothermic-Silicide Method as a Master Alloy The preparation of the $Y_2O_3$+carbon+Si briquettes is the same as described above for $La_2O_3$, except that commercial grade purity $Y_2O_3$ was used instead of $La_2O_3$ and the amounts of carbon and Si were adjusted to the proportions required according to chemical reaction (1).

Carbothermic Reduction [KAA-1-215RC(Y)] to Prepare $Y_5Si_{2.6}$ as a Master Alloy A set of briquettes weighing 64.4 g containing $Y_2O_3$, Si and carbon were placed in a Ta crucible of the same dimensions as described above in Example 1 for La, and heated under vacuum using a mechanical vacuum pump to 1650° C. and then to 1800° C. for 1 hour using both a mechanical vacuum pump and a diffusion vacuum pump (200 to 600 μm max pressure). The heating schedule was as follows:

Heat @ 20° C./min. to 1100° C. and hold for 6 min.
Heat @ 20° C./min. to 1400° C. and hold for 6 min.
Heat @ 10° C./min. to 1650° C. and hold for 1.5 hrs.
Valve in diffusion pump and heat @ 10° C./min. to 1860° C. and hold for 6 min.
Cool @ 10° C./min. to 1800° C. and hold for 1 hr.
Cool @ 10° C. to 1600° C.
Cool @ 30° C./min. to room temperature.

The prepared alloy was then removed from the Ta crucible and was found to contain 1.9 wt. % carbon (C), and 3.2 wt. % oxygen (O). The alloy reacted water and, formed bubbles of gas indicating that some Y carbides were present, which is consistent with the high carbon content. The high carbon and oxygen contents along with the existence of Y carbides, suggests that the reaction did not go to completion, primarily because the maximum temperature was not sufficient to melt the highest melting Y silicide, $Y_5Si_3$ ($T_m$=1875° C.). This was due to the fact that the furnace being utilized could only reach 1860° C., and the maximum temperature needed to assure the completion of the reaction is about 50° C. above the highest melting compound in the Y—Si system.

The master alloy can be utilized as an alloying agent to improve corrosion and oxidation resistance of superalloys and the high temperature creep resistance to commercial Mg alloys.

The $Y_5Si_{2.6}$ alloy reacts slowly with the ambient air, see FIG. 6, because of the presence of Y carbides in the product. Applicants expect that the oxidation resistance of $Y_5S_{2.6}$ would be comparable to that of Y metal, based on experiences with the other three rare earth silicide master alloys as shown in FIGS. 1, 6 and 7.

Although the present invention has been described above in connection with certain illustrative embodiments thereof, those skilled in the art will appreciate that changes and modifications can be made therein with the scope of the invention as set forth in the appended claims.

The invention claimed is:

1. A method of making a rare earth-based alloy, comprising carbothermically reducing an oxide selected from the group consisting of La-containing oxide, a Ce-containing oxide, and MM-containing oxide in the presence of carbon as a reducing agent and a source of a reactant element X at a temperature less than about 1800 degrees C. wherein X is selected from the group consisting of Si, Ge, Sn, Pb, As, Sb, Bi, and P to achieve substantial completion of the carbothermic reduction reaction to form a low carbon alloy that comprises a majority of a rare earth element selected from the group consisting of La, Ce, and MM, a minor amount of X present in an amount of about 1 weight % to 18 weight % of the alloy, and a low carbon content in an amount of about 2 weight % or less of the alloy.

2. The method of claim 1 wherein the oxide comprises $La_2O_3$.

3. The method of claim 2 wherein the alloy comprises $LaSi_{0.5}$.

4. The method of claim 2 wherein the alloy comprises $LaX'_{0.5}$, where X' is selected from the group consisting of Ge, Sn, Pb, As, Sb, Bi, and P.

5. The method of claim 1 wherein the carbothermic reduction is initiated at a temperature of at least about 1300 degrees C.

6. The method of claim 1 wherein the oxide comprises $CeO_2$.

7. The method of claim 6 wherein the alloy comprises $CeSi_{0.5}$.

8. The method of claim 6 wherein the alloy comprises $CeX'_{0.5}$, where X' is selected from the group consisting of Ge, Sn, Pb, As, Sb, Bi, and P.

9. The method of claim 1 wherein the oxide comprises mischmetal (MM) oxide.

10. The method of claim 9 wherein the alloy comprises $MMSi_{0.5}$.

11. The method of claim 9 wherein the alloy comprises $MMX'_{0.5}$, where X is selected from the group consisting of Ge, Sn, Pb, As, Sb, Bi, and P.

12. The method of claim 1 wherein zirconium oxide also is present and reduced.

13. The method of claim 1 wherein the reactant element is Si.

14. The method of claim 1 including providing a substantially stoichiometric amount of carbon as a reducing agent relative to oxides present.

15. The method of claim 1 wherein the carbon content of the alloy is in a range of about 0.005 weight % to about 2 weight % C.

16. A method of making a rare earth-based alloy, comprising carbothermically reducing an oxide selected from the group consisting of a La-containing oxide, a Ce-containing oxide, and a MM-containing oxide in the presence of carbon particles as a reducing agent and silicon particles to achieve substantial completion of the carbothermic reduction reaction at a temperature below 1800 degrees C. to form a low carbon alloy that comprises a majority of a rare earth element selected from the group consisting of La, Ce, and MM, a minor amount of Si present in a range of about 1.0 weight % to about 18 weight % of the alloy, and an amount of C in a range of about 0.005 weight % to about 2 weight % of the alloy.

* * * * *